United States Patent
Boyette et al.

(10) Patent No.: US 9,549,032 B2
(45) Date of Patent: Jan. 17, 2017

(54) MOBILE CONTENT MANAGEMENT FOR OFFLINE CONTENT ACCESS

(71) Applicant: CA, INC., New York, NY (US)

(72) Inventors: Neil Boyette, Oregon City, OR (US); Vikas Krishna, San Jose, CA (US)

(73) Assignee: CA, Inc., New York, NY (US)

(*) Notice: Subject to any disclaimer, the term of this patent is extended or adjusted under 35 U.S.C. 154(b) by 29 days.

(21) Appl. No.: 14/577,351

(22) Filed: Dec. 19, 2014

(65) Prior Publication Data

US 2016/0182663 A1 Jun. 23, 2016

(51) Int. Cl.
*H04L 29/06* (2006.01)
*H04L 29/08* (2006.01)
*H04W 4/02* (2009.01)

(52) U.S. Cl.
CPC ............... *H04L 67/26* (2013.01); *H04L 63/20* (2013.01); *H04W 4/02* (2013.01)

(58) Field of Classification Search
CPC ........................ H04L 63/20; G06F 17/30867
USPC .............................. 726/1; 707/748, E17.044
See application file for complete search history.

(56) References Cited

U.S. PATENT DOCUMENTS

| | | | | |
|---|---|---|---|---|
| 5,978,833 A * | 11/1999 | Pashley | ............ | G06F 17/30899 707/E17.119 |
| 7,483,946 B2 * | 1/2009 | Boyd | ............ | G06Q 10/109 709/203 |
| 8,613,070 B1 * | 12/2013 | Borzycki | ............ | G06F 21/6218 726/8 |
| 2005/0266836 A1 * | 12/2005 | Shan | ............ | H04L 63/0281 455/417 |
| 2007/0016661 A1 * | 1/2007 | Malik | ............ | G06Q 10/109 709/223 |
| 2010/0174756 A1 * | 7/2010 | Lazaridis | ............ | G06Q 30/00 707/802 |
| 2011/0137929 A1 * | 6/2011 | Lehmann | ............ | G06Q 10/109 707/769 |
| 2011/0231409 A1 * | 9/2011 | Dhara | ............ | H04L 12/1818 707/748 |
| 2011/0252097 A1 * | 10/2011 | Walker | ............ | G06Q 10/06 709/206 |
| 2012/0036245 A1 * | 2/2012 | Dare | ............ | G06F 8/60 709/223 |
| 2012/0129503 A1 * | 5/2012 | Lindeman | ............ | H04W 4/001 455/414.1 |
| 2013/0086603 A1 * | 4/2013 | Kruger | ............ | G06F 17/30867 725/14 |
| 2013/0173796 A1 * | 7/2013 | Grab | ............ | H04N 21/251 709/225 |
| 2014/0108382 A1 * | 4/2014 | Garg | ............ | G06F 17/30038 707/722 |
| 2014/0244332 A1 * | 8/2014 | Mermelstein | ...... | G06Q 10/1093 705/7.16 |
| 2014/0324802 A1 * | 10/2014 | Leonard | ............ | H04L 12/24 707/694 |

(Continued)

Primary Examiner — Nabil El Hady
(74) Attorney, Agent, or Firm — Myers Bigel, P.A.

(57) ABSTRACT

A method includes performing operations as follows on a processor: associating content stored on a data processing system with an event associated with a user, determining when the event is to occur, and pushing the content from the data processing system to a mobile device associated with the user not later than the occurrence of the event for storage on the mobile device.

16 Claims, 5 Drawing Sheets

(56) References Cited

U.S. PATENT DOCUMENTS

| | | | |
|---|---|---|---|
| 2015/0006221 A1* | 1/2015 | Mermelstein | G06Q 10/1095 705/7.19 |
| 2015/0058873 A1* | 2/2015 | Newell | H04N 21/47214 725/14 |
| 2015/0127607 A1* | 5/2015 | Savage | G06F 17/30194 707/610 |
| 2015/0127628 A1* | 5/2015 | Rathod | H04W 4/206 707/710 |
| 2016/0072844 A1* | 3/2016 | Porras | H04L 63/10 726/1 |
| 2016/0092339 A1* | 3/2016 | Straub | H04L 67/26 717/124 |

* cited by examiner

MOBILE CONTENT MANAGEMENT FOR OFFLINE CONTENT ACCESS

BACKGROUND

The present disclosure relates to computing systems, and, in particular, to security management of mobile devices and improving productivity when using mobile devices and/or applications.

Enterprises have employees and/or customers that download applications onto their mobile devices, such as smart phones, tablets, laptops, and the like. These applications may allow the users to access various types of content and data belonging to the enterprise. Because mobile devices may be more susceptible to being stolen, misplaced, or compromised in some way, enterprises may deploy a set of security tools that may provide a security layer around the mobile applications. Mobile Content Management (MCM) tools may provide the ability for a user to securely access, and collaborate on, content stored by an enterprise. As much of an enterprise's content may be considered sensitive or proprietary, an enterprise may place adopt policies that include restrictions on invoking certain applications or accessing certain types of data or files to ensure that sensitive information is not compromised. These restrictions may include operation limitations, geo fence limitations, time of day/week limitations, and access limitations. Other restrictions may include limitations on copying a file to local storage, e.g., a mobile device or desktop computer, for viewing or modification. The policies may also include requirements that various applications and/or other software components, such as operating systems, be upgraded before certain applications and/or data can be used. While such policies have a valid purpose in enhancing the security of mobile devices, the policies may in some instances be ill-defined and, as a result, place unnecessary burdens on users that negatively impact their productivity, as well as incur higher data charges for the enterprise when user access online content from outside their home country.

SUMMARY

In some embodiments of the inventive subject matter, a method comprises performing operations as follows on a processor: associating content stored on a data processing system with an event associated with a user, determining when the event is to occur, and pushing the content from the data processing system to a mobile device associated with the user not later than the occurrence of the event for storage on the mobile device.

In still other embodiments of the inventive subject matter, a computer program product comprises a tangible computer readable storage medium comprising computer readable program code embodied in the medium that when executed by a processor causes the processor to perform operations comprising: associating content stored on a data processing system with an event associated with a user, determining when the event is to occur, and pushing the content from the data processing system to a mobile device associated with the user not later than the occurrence of the event for storage on the mobile device.

In still further embodiments of the inventive subject matter, a system comprises a processor and a memory coupled to the processor and comprising computer readable program code embodied in the memory that when executed by the processor causes the processor to perform operations comprising: associating content stored on a data processing system with an event associated with a user, determining when the event is to occur, and pushing the content from the data processing system to a mobile device associated with the user not later than the occurrence of the event for storage on the mobile device.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "event" means the occurrence of something.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

Some embodiments of the inventive subject matter stem from a realization that a Mobile Content Management (MCM) application may be run on an enterprise server and a companion application run on a mobile device to manage access to content that is stored on the enterprise's data processing systems. The enterprise content may have security requirements associated therewith, which may prevent a user from viewing and/or modifying the content offline, i.e., local storage of the files may be forbidden. The enterprise MCM application may include a knowledge engine that monitors content on a data processing system to associate the content with event information associated with a user, such as locations, people, and meetings. For example, the enterprise MCM application may cooperate with a calendar application to determine that a user is going to travel to a particular location or meet with a particular person and one or more files may be useful to the user for that event. The file(s) are then pushed out to the user's mobile device, such as a smart phone, tablet, or the like to allow the user to view and/or modify the file(s) locally. To ensure that the content is not distributed beyond the mobile device, a mobile content access module on the mobile device may prevent the content from being communicated to other systems or devices via email or other suitable application, or copied onto portable memory devices. Once the calendar event is complete, the enterprise MCM application may remove the file from the user's device when the device communicatively reconnects to the enterprise server. Changes to the file may also be synchronized with the version of the file stored on the server. The content that is pushed out to the user's mobile device may also have an expiration time period associated therewith such that after the expiration of the time period the content that was pushed out to the mobile device can no long be modified and/or viewed.

Figure 1:
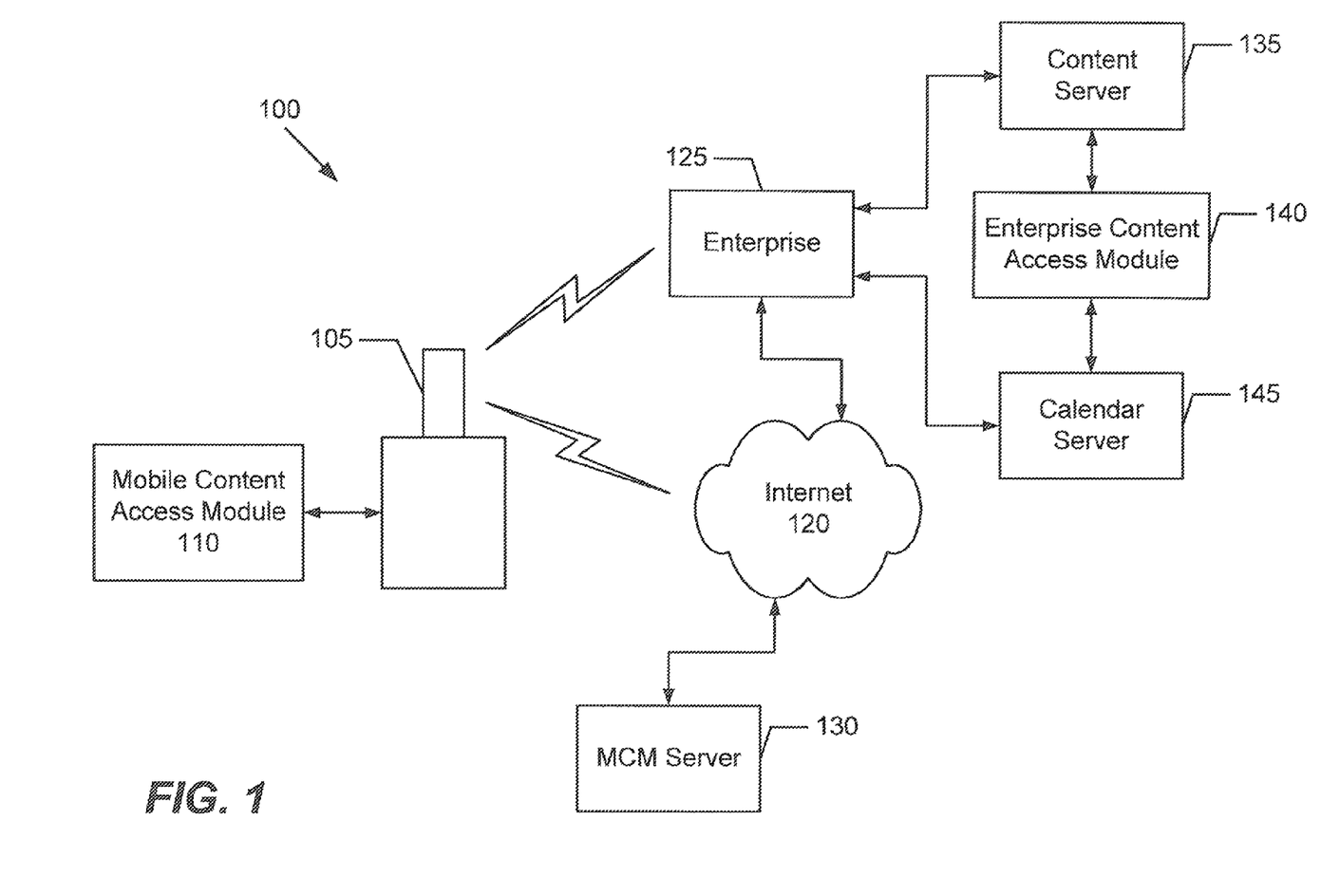
FIG. 1 is a block diagram of a system for managing enterprise content for offline access via mobile devices in accordance with some embodiments of the inventive subject matter.

FIG. 1 is a block diagram of a system for managing enterprise content for offline access via mobile devices in accordance with some embodiments of the inventive subject matter. Employees of an enterprise, for example, may use mobile devices, such as smart phones, tablets, laptops, and the like to access various types of content belonging to the enterprise. As shown in FIG. 1, a mobile device 105 may be used to communicate with an enterprise 125 (i.e., enterprise server(s)) using a direct wireless connection or via various networks, which are represented by the Internet 120.

Because mobile devices are typically more susceptible to being stolen, lost, or compromised versus desktop computing devices, the enterprise server 125 may use MCM tools to provide additional security functionality with respect to the access of enterprise content by a user via a mobile device. As described above, an MCM application may be run on an enterprise server and a companion application run on a mobile device to manage access to content that stored on the enterprise's data processing systems. The enterprise content may have security requirements associated therewith that are set forth through security policies approved by the enterprise, which may prevent a user from viewing and/or modifying the content offline, i.e., local storage of the files may be forbidden.

A MCM server 130 may provide a mobile content access module 110 that can be downloaded to the mobile device 105 either directly or, for example, through the enterprise 125. The mobile content access module 110 may be configured to communicate with the enterprise server 125 to receive content therefrom that can be stored locally on the mobile device 105. The mobile content access module 110 may be configured to allow the user to view and/or modify content that is received from the enterprise server 125 and may also enforce restrictions preventing the user from communicating the enterprise content to other devices or systems or copying the content to portable storage devices for example. The content may have a defined time period for which it can be viewed and modified on the mobile device 105 that overlaps, for example, with a particular event for which the content was pushed out to the mobile device 105. At the expiration of this time period, the mobile access content module 110 may prohibit viewing and/or modification of the content on the mobile device 105.

The enterprise server 125 may have multiple server data processing systems associated therewith responsible for various operations of the enterprise. As shown in FIG. 1, the enterprise server 125 communicates with both a content server 135 and a calendar server 145. The MCM server 130 may download an enterprise content access module 140 that includes a knowledge engine that monitors a user's access of content residing on the content server 135 so as to associate content with event information, such as locations, people, functions, activities, and/or meetings. To make these associations between content and events, the enterprise content access module 140 may cooperate with a calendar application residing on the calendar server 145 to determine, for example, that a user is going to travel to a location, meet with a person(s), attend a function, participate in an activity, and the like, and some particular content may be useful to the user for that event. The content may then be pushed out to the mobile device 105 not later than the occurrence of the event so that the user may view and/or modify the content locally on the mobile device during the event. The knowledge engine of the enterprise content access module 140 may also monitor other applications, such as email and social media, to make associations between content and events. The content itself may also be analyzed to identify potential associations. For example, the content may have metadata associated therewith that identify a particular location or activity (e.g., a title may identify a conference in a city, a customer, a customer location, or the like) or the text of a file, for example, may identify multiple authors or a customer for which the content is being prepared. Although the enterprise is shown to have three server data processing systems—enterprise server 125, content server 135, and calendar server 145—it will be understood that the enterprise may have different numbers of server data processing systems with particular functionality combined or divided in a variety of ways. Moreover, the server data processing systems may be implemented as virtual servers on a common hardware platform in some embodiments.

As shown in FIG. 1, the connections between the enterprise server 125, MCM server 130, and the mobile device 105 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for managing enterprise content for offline access via mobile devices according to some embodiments of the inventive subject matter, it will be understood that embodiments of the present invention are not limited to such configurations, but are intended to encompass any configuration capable of carrying out the operations described herein.

Figure 2:
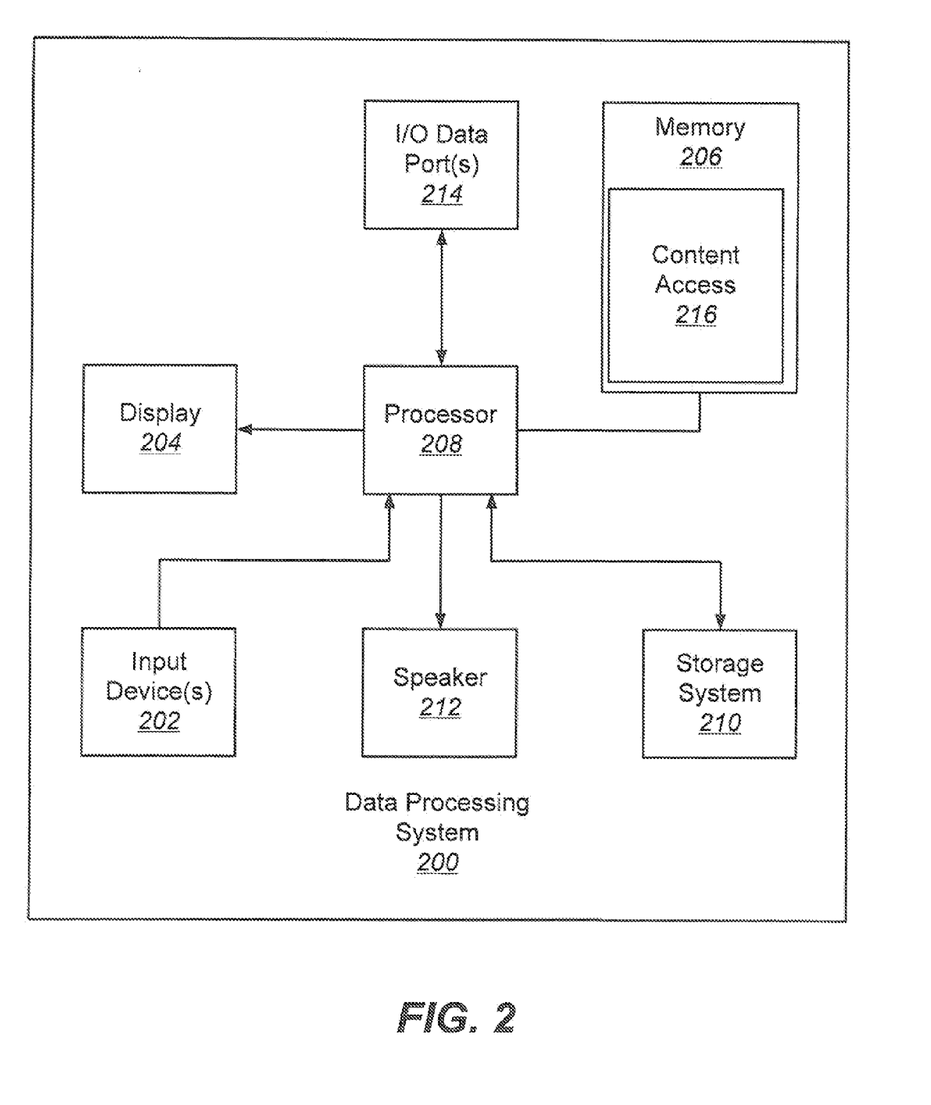
FIG. 2 illustrates a data processing system that may be used to implement the Mobile Content Management (MCM) server of FIG. 1 in accordance with some embodiments of the inventive subject matter.

Referring now to FIG. 2, a data processing system 200 that may be used to implement the MCM server 130 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a content access module 216 that may be configured to provide the mobile content access module 110 and enterprise content access module 140 of FIG. 1 according to some embodiments of the inventive subject matter.

Figure 3:
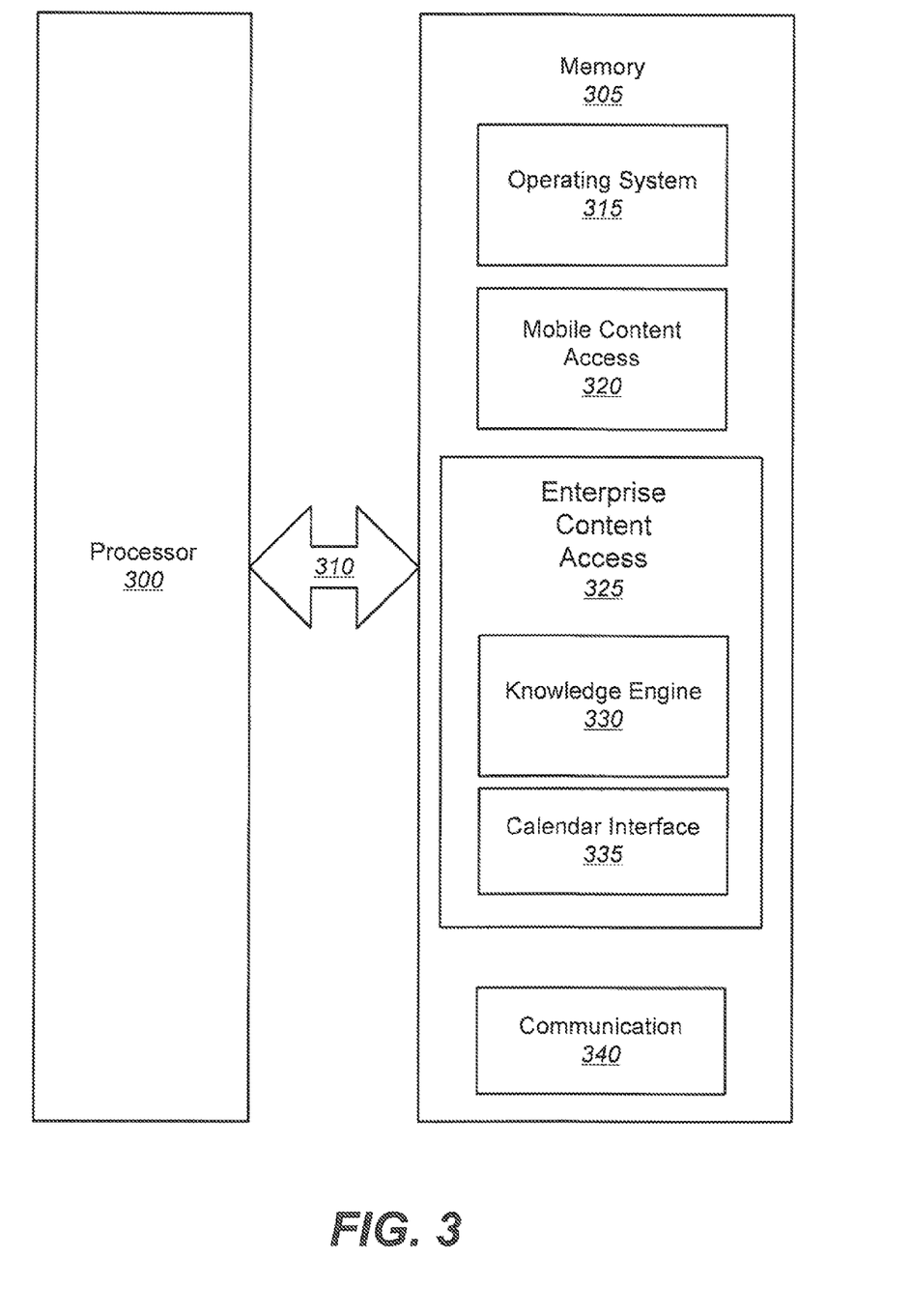
FIG. 3 is a block diagram that illustrates a software/hardware architecture for the MCM server of FIG. 1 in accordance with some embodiments of the present inventive subject matter.

FIG. 3 illustrates a processor 300 and memory 305 that may be used in embodiments of data processing systems, such as the MCM server 130 of FIG. 1 and the data processing system 200 of FIG. 2, respectively, for managing enterprise content for offline access via mobile devices according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for managing enterprise content for offline access via mobile devices in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to four or more categories of software and/or data: an operating system 315, a mobile content access module 320, an enterprise content access module 325, and a communication module 340. The operating system 315 generally controls the operation of the data processing system. In particular, the operating system 315 may manage the data processing system's software and/or hardware resources and may coordinate execution of programs by the processor 300. The mobile content access module 320 may provide the mobile content access module 110 of FIG. 1 that can be downloaded to a mobile device 105 either directly from the MCM server 130 or indirectly through the enterprise server 125, for example. Similarly, the enterprise content access module 325 may provide the enterprise content access module 140 of FIG. 1 that can be downloaded to the content server 135 and/or the calendar server 145 via the enterprise server 125. The enterprise content access module 325 may comprise a knowledge engine module 330 and a calendar interface 335 module. The knowledge engine module 330 may monitor and evaluate the content stored on the content server 135 to make associations between the content and events. In some embodiments, the knowledge engine module evaluates the content itself to identify associations between the content and events by, for example, scanning the content for references to locations, people, customers, colleagues, and the like. The knowledge engine module 330 may also analyze metadata associated with the content including titles, storage placement on the content server 135 (e.g., names of directories or folders), and the like to make associations between the content and events. The knowledge engine module 330 may also cooperate with other applications, such as email and social media applications, to associate content with events. With respect to email, the knowledge engine module 330 may identify persons, locations, organizations, and the like that content is communicated to. With respect to social media, the knowledge engine module 330 may identify references to content in the context of a particular social media application to make associations with persons, organizations, activities, functions, locations, and the like.

The calendar interface module 335 may cooperate with a calendar application residing on the calendar server 145 to access calendar information associated with a user, which can be used to associate content with an event. For example, the calendar information may comprise an identity of a person, meeting information, travel itinerary information, geographic location information, function information, activity information, organization information, and the like. The calendar interface module 335 in cooperation with the knowledge engine 330 may determine that content may be useful to a user for an event based on the calendar information and associations made by the knowledge engine 330 between content and various entities, locations, functions, activities, and the like.

The communication module 340 may be configured to facilitate communication between the MCM server 130 and other entities, such as the mobile device 105 and the enterprise server 125. The communication module 340 may cooperate with the enterprise content access module 325 to push content out to the mobile device 105 not later than the occurrence of an event with which the content is associated so that the user may view and/or modify the content locally on the mobile device during the event. The content may have a defined time period for which it can be viewed and modified on the mobile device 105 that overlaps, for example, with a particular event for which the content was pushed out to the mobile device 105. Once the calendar event is complete, the enterprise content access module 325 may remove the content from the mobile device 105 when the device communicatively reconnects to the enterprise server 125. Changes to the content that were made locally on the mobile device 105 may also be synchronized with the version of the content stored on the content server 135.

Although FIG. 3 illustrates hardware/software architectures that may be used in data processing systems, such as the MCM server 130 of FIG. 1 and the data processing system 200 of FIG. 2, respectively, for managing enterprise content for offline access via mobile devices according to some embodiments of the inventive subject matter, it will be understood that the present invention is not limited to such a configuration but is intended to encompass any configuration capable of carrying out operations described herein.

Figure 4:
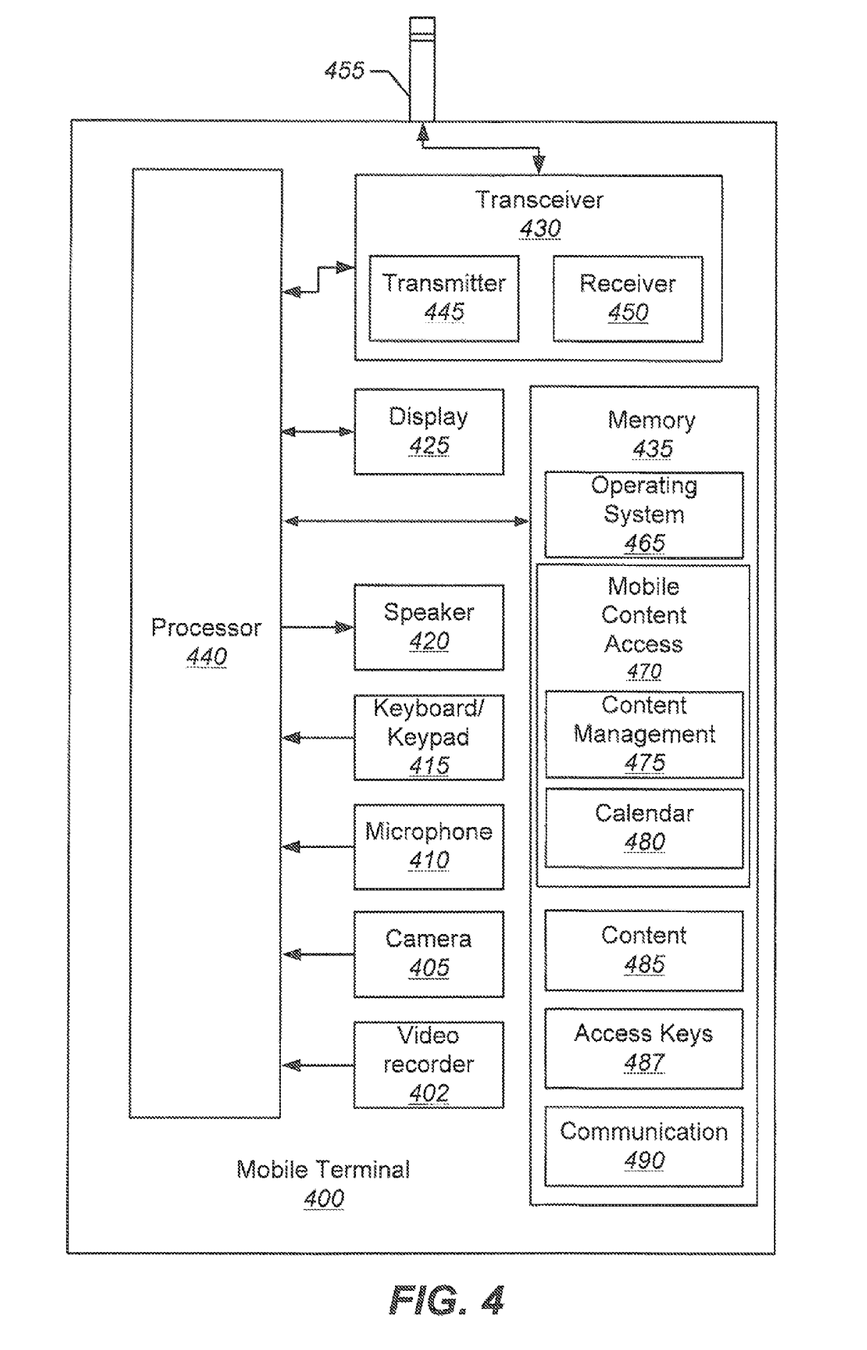
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminal 105 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to provide a phone-based Web server with a private IP address, in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to four or more categories of software and/or data: the operating system 465, the mobile content access module 470, the content module 485, the access keys module 487, and the communication module 490. The operating system 465 generally controls the operation of the mobile terminal 400. In particular, the operating system 465 may manage the mobile terminal's software and/or hardware resources and may coordinate execution of programs by the processor 440. The mobile content access module 470 may correspond to the mobile access content access module 110 of FIG. 1 and may be configured to receive content from the enterprise server 125 that is pushed out from the content server 135 as being associated with an event. The content management module 475 may be configured to allow the user to view and/or modify the content that is received from the enterprise server 125 and may also enforce restrictions preventing the user from communicating the enterprise content to other devices or systems or copying the content to portable storage devices for example.

The calendar module 480 may cooperate with a calendar application on the mobile terminal 400 to determine when the event with which the content is associated has occurred and also provide a general time reference. The content may have a defined time period for which it can be viewed and modified on the mobile device 105 that overlaps, for example, with a particular event for which the content was pushed out to the mobile device 105. At the expiration of this time period, the content management module 475 may prohibit viewing and/or modification of the content on the mobile device 105.

The content module 485 represents the content that is pushed out from the content server 135 by way of the enterprise server 125. The communication module 490 may be configured to facilitate communication between the mobile terminal 105/400 and other entities, such as the enterprise server 125 and MCM server 130.

The embodiments described above have been directed to managing content for offline access by pushing the content out from an enterprise server to a mobile device based on an event occurrence. In some embodiments, instead of pushing the actual content from the enterprise server complex 125, 135, 145, an access key corresponding to one or more items of content may be pushed to the mobile device 105/400. The mobile device 105/400 may use the key to retrieve the actual content from the enterprise server 125 when the content is needed. The content may be retrieved in encrypted form, in some embodiments, and the access key may be used to decrypt the content as described below. In other embodiments, both an access key and the content are pushed to the mobile device 105/400. The content, however, may be in encrypted form requiring the associated key to decrypt the content for access. In some embodiments, an access key may be encoded to cooperate with the content management module 475 so as to restrict access to the content 485 based on factors such as location, time (year, month, day, hour, minute, etc.), activity, access mechanism (e.g., Wi-Fi), security, and the like. Location may be based on for example, a network address of an edge router with which the mobile device 105/400 communicates. The access keys module 487 represents these access keys that can be pushed from the enterprise server complex 125, 135, and 145.

Although FIG. 4 illustrates an exemplary software and hardware architecture that may be used to manage enterprise content for offline access via mobile devices according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MCM server 130, data processing system 200, hardware/software architecture of FIG. 3, enterprise server 125, content server 135, calendar server 145, and mobile device 105/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
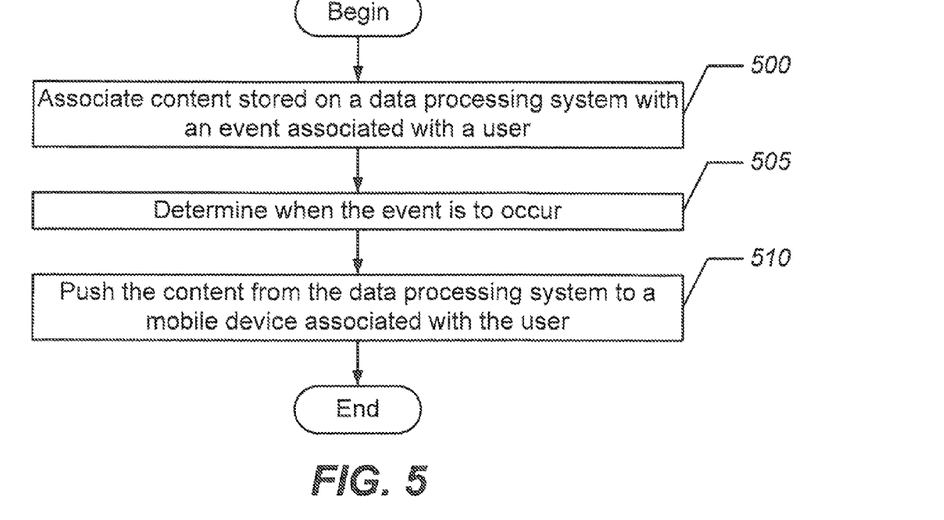
FIGS. 5 and 6 are flowcharts that illustrate operations for managing enterprise content for offline access via mobile devices in accordance with some embodiments of the inventive subject matter.
Figure 6:
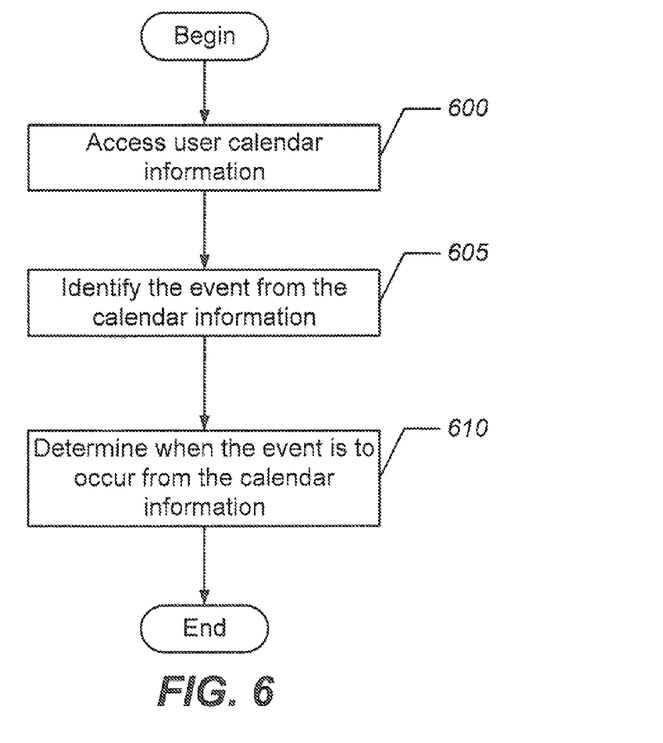

FIGS. 5 and 6 are flowcharts that illustrate operations for managing enterprise content for offline access via mobile devices in accordance with some embodiments of the inventive subject matter. Referring now to FIG. 5, operations begin at block 500 where the enterprise content access module 140 associates content stored on a data processing system with an event associated with a user. At block 505, the enterprise content access module 140 cooperates with a calendar server to determine when the event is to occur. The enterprise content access module 140 then pushes out the content through the enterprise server 125 to the mobile device 105 associated with the user in advance of the event to allow the user to access the content locally on the mobile device during the event at block 510. Because the content may have a general security policy that prohibits the content from being stored locally on mobile devices due to mobile devices typically being more susceptible to being stolen, misplaced, or compromised in some way, embodiments of the present inventive subject matter may create an exception to this general security policy allowing local storage of content for a limited time period and with protections in place preventing further communication of the content to other devices and possible limitations on modification and/or viewing.

Referring now to FIG. 6, operations for associating the content with an event associated with the user may involve cooperation between the enterprise content access module 140 and the calendar server 145. At block 600 the enterprise content access module 140 communicates with the calendar server 145 to access calendar information associated with the user. The calendar information may include, but is not limited to, an identify of a person that is associated with the content, meeting information that is associated with the content, travel itinerary information that is associated with the content, and/or geographic location information that is associated with the content. The enterprise content access module 140 evaluates the user calendar information and identifies the event therefrom at block 605. The enterprise content access module 140 is also able to determine when the event is to occur based on the day/time associated with the event on the user's calendar at block 610.

Embodiments of the present inventive subject matter may assist an enterprise in improving efficiency in the manner in which the enterprise's content is used while maintaining a desired level of security. For example, an employee may not be allowed to access an enterprise's servers to view and/or modify content from certain locations, e.g., Wi-Fi hot spots or other public/private network access points that don't provide a sufficient level of security. Moreover, an employee that is traveling may incur significant data charges for accessing an enterprise's network depending on the particular regions the employee and enterprise are located in. Embodiments of the present invention may provide a limited exception of the general security rule of disallowing a user from storing enterprise content locally on a mobile device. By associating content with a particular event, the content can be pushed out to the mobile device where the user can view and/or modify the content for a defined time period that overlaps with the event. Safeguards can be put in place to prevent the user from transferring the content to another portable storage device and/or communicating the content to another entity via email, for example. Once the time period has lapsed, the content can be effectively locked on the mobile device preventing additional viewing and/or modification. Once the user reconnects the mobile device to the enterprise's server, the content can be deleted from the mobile device and any modifications may, in some embodiments, be synchronized with the version of the content stored at the enterprise. Thus, the user may make efficient use of the content for a limited purpose associated with an event while the enterprise is able to maintain control over how the content is used/distributed to reduce the risk of a security breach.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:

performing operations as follows on a processor:

associating content stored on a data processing system with an event associated with a user;

determining when the event is to occur;

pushing the content from the data processing system to a mobile device associated with the user not later than the occurrence of the event for storage on the mobile device;

wherein the content has a general security policy associated therewith prohibiting communication of the content to the mobile device for storage on the mobile device; the method further comprising:

creating an exception to the general security policy so as to allow communication of the content to the mobile device for storage on the mobile device for a defined time period that overlaps with the occurrence of the event; and removing the content from the mobile device when the mobile device communicatively connects to the data processing system after the occurrence of the event.

2. The method of claim 1, wherein the content cannot be modified on the mobile device after expiration of the defined time period.

3. The method of claim 1, wherein the content cannot be viewed on the mobile device after expiration of the defined time period.

4. The method of claim 1, further comprising:
updating the content stored on the data processing system with changes made to the content while stored on the mobile device.

5. The method of claim 1, wherein associating the content stored on the data processing system with the event associated with the user comprises:
accessing calendar information associated with the user; and
identifying the event from the calendar information; and
wherein determining when the event is to occur comprises:
determining when the event is to occur from the calendar information.

6. The method of claim 5, wherein the calendar information comprises an identity of a person that is associated with the content stored on the data processing system.

7. The method of claim 5, wherein the calendar information comprises meeting information that is associated with the content stored on the data processing system.

8. The method of claim 5, wherein the calendar information comprises travel itinerary information that is associated with the content stored on the data processing system.

9. The method of claim 5, wherein the calendar information comprises an identity of a geographic location that is associated with the content stored on the data processing system.

10. A computer program product, comprising:
a tangible computer readable storage medium comprising computer readable program code embodied in the medium that when executed by a processor causes the processor to perform operations comprising:
associating content stored on a data processing system with an event associated with a user;
determining when the event is to occur;
pushing the content from the data processing system to a mobile device associated with the user not later than the occurrence of the event for storage on the mobile device;
wherein the content has a general security policy associated therewith prohibiting communication of the content to the mobile device for storage on the mobile device; the operations further comprising:
creating an exception to the general security policy so as to allow communication of the content to the mobile device for storage on the mobile device for a defined time period that overlaps with the occurrence of the event; and
removing the content from the mobile device when the mobile device communicatively connects to the data processing system after the occurrence of the event.

11. The computer program product of claim 10, wherein the content cannot be modified on the mobile device after expiration of the defined time period.

12. The computer program product of claim 10, wherein the content cannot be viewed on the mobile device after expiration of the defined time period.

13. The computer program product of claim 10, further comprising:
updating the content stored on the data processing system with changes made to the content while stored on the mobile device.

14. The computer program product of claim 10, wherein associating the content stored on the data processing system with the event associated with the user comprises:
accessing calendar information associated with the user; and
identifying the event from the calendar information; and
wherein determining when the event is to occur comprises:
determining when the event is to occur from the calendar information.

15. A system, comprising:
a processor; and
a memory coupled to the processor and comprising computer readable program code embodied in the memory that when executed by the processor causes the processor to perform operations comprising:
associating content stored on a data processing system with an event associated with a user;
determining when the event is to occur;
pushing the content from the data processing system to a mobile device associated with the user not later than the occurrence of the event for storage on the mobile device;
wherein the content has a general security policy associated therewith prohibiting communication of the content to the mobile device for storage on the mobile device; the operations further comprising:
creating an exception to the general security policy so as to allow communication of the content to the mobile device for storage on the mobile device for a defined time period that overlaps with the occurrence of the event; and
removing the content from the mobile device when the mobile device communicatively connects to the data processing system after the occurrence of the event.

16. The system of claim 15, wherein associating the content stored on the data processing system with the event associated with the user comprises:
accessing calendar information associated with the user; and
identifying the event from the calendar information; and
wherein determining when the event is to occur comprises:
determining when the event is to occur from the calendar information.

* * * * *